United States Patent
O'Neill et al.

(10) Patent No.: US 10,733,611 B2
(45) Date of Patent: Aug. 4, 2020

(54) SYSTEMS AND METHODS FOR LOCALLY PROCESSING A FINANCIAL TRANSACTION

(71) Applicant: MasterCard International Incorporated, Purchase, NY (US)

(72) Inventors: John O'Neill, Darien, CT (US); Jennifer Boschert, O'Fallon, MO (US); Shasidhar Vemireddy, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 405 days.

(21) Appl. No.: 15/225,984

(22) Filed: Aug. 2, 2016

(65) Prior Publication Data
US 2018/0039984 A1  Feb. 8, 2018

(51) Int. Cl.
*G06Q 20/40* (2012.01)

(52) U.S. Cl.
CPC ....... *G06Q 20/405* (2013.01); *G06Q 20/4033* (2013.01)

(58) Field of Classification Search
CPC . G06Q 20/405; G06Q 20/202; H04L 43/0811
See application file for complete search history.

(56) References Cited

U.S. PATENT DOCUMENTS 7,970,669 B1 * 6/2011 Santos ............... G06Q 10/087
235/379
8,308,059 B2   11/2012 Granucci et al.
8,639,291 B1 *  1/2014 Gailloux ........... H04W 52/0274
455/558

(Continued)

FOREIGN PATENT DOCUMENTS

CN   103077456 A  *  5/2013
WO   2015183176     12/2015

OTHER PUBLICATIONS

EMV: A to Z, First Data Corporation, accessible at https://www.firstdata.com/downloads/marketing-merchant/EMV-A-toZ.pdf, last accessed Aug. 2, 2016.

(Continued)

*Primary Examiner* — Allen C Chein

(57) ABSTRACT

Embodiments of the disclosure enable a merchant system to locally process one or more financial transactions at the merchant system. The merchant system receives a payment request associated with a financial transaction, determines a network communication status associated with a network interface device coupleable to a payment processing network, and, on condition that the network communication status does not satisfy a network communication threshold, obtains an account threshold associated with a cardholder account, generates transaction data associated with the financial transaction based on the account threshold, presents an indication associated with the financial transaction, and stores the transaction data for later transmission of the transaction data to the payment processing network. Aspects of the disclosure provide for processing one or more financial transactions at a merchant system independent of a payment processing network.

20 Claims, 8 Drawing Sheets

(56) References Cited

U.S. PATENT DOCUMENTS

| | | | |
|---|---|---|---|
| 2004/0010626 A1* | 1/2004 | Gillam | H04L 67/06 709/250 |
| 2008/0065648 A1* | 3/2008 | Gupta | G06F 17/30575 |
| 2009/0157537 A1* | 6/2009 | Miller | G06Q 10/109 705/32 |
| 2011/0320356 A1* | 12/2011 | Hong | G06Q 20/10 705/44 |
| 2012/0078789 A1* | 3/2012 | Harrell | G06Q 20/12 705/44 |
| 2012/0158654 A1 | 6/2012 | von Behren et al. | |
| 2013/0054417 A1* | 2/2013 | O'Donoghue | G06Q 20/02 705/26.43 |
| 2013/0138563 A1 | 5/2013 | Gilder | |
| 2013/0151405 A1* | 6/2013 | Head | G06Q 20/36 705/41 |
| 2013/0179352 A1* | 7/2013 | Dwyre | G06Q 20/20 705/71 |
| 2013/0246617 A1* | 9/2013 | Zheng | H04L 41/0663 709/224 |
| 2013/0346307 A1 | 12/2013 | Kopp | |
| 2014/0025958 A1* | 1/2014 | Calman | G06Q 20/3224 713/189 |
| 2014/0258118 A1* | 9/2014 | Scott | G06Q 20/204 705/44 |
| 2014/0279521 A1* | 9/2014 | Van Den Broeck | G06Q 20/02 705/44 |
| 2014/0310113 A1 | 10/2014 | Sengupta et al. | |
| 2015/0206116 A1* | 7/2015 | Bess | G06Q 20/202 705/21 |
| 2015/0371216 A1 | 12/2015 | Olawale et al. | |
| 2015/0371481 A1* | 12/2015 | Xu | G07D 11/0063 382/135 |
| 2016/0110718 A1* | 4/2016 | Jajara | G06Q 20/322 705/44 |
| 2017/0178090 A1* | 6/2017 | Sarin | G06Q 20/3224 |
| 2017/0193498 A1* | 7/2017 | Metral | G06Q 20/36 |
| 2017/0236121 A1* | 8/2017 | Lyons | G06F 17/3033 705/71 |
| 2018/0039984 A1* | 2/2018 | O'Neill | G06Q 20/405 |
| 2018/0047016 A1* | 2/2018 | Sarin | G06Q 20/3674 |
| 2018/0144339 A1* | 5/2018 | Beidas | G06Q 20/10 |

OTHER PUBLICATIONS

Apple Pay security and privacy overview, Apple Inc., accessible at https://support.apple.com/en-us/HT203027, last accessed Aug. 2, 2016.

Operating Guide, Elavon, Inc., accessible at https://www.merchantconnect.com/CWRWeb/pdf/MOG_Eng.pdf, last accessed Aug. 2, 2016.

Electronic Funds Transfer Disclosure Statement and Agreement, ESL Federal Credit Union, last accessed Aug. 2, 2016.

* cited by examiner

SYSTEMS AND METHODS FOR LOCALLY PROCESSING A FINANCIAL TRANSACTION

FIELD OF THE DISCLOSURE

The subject matter described herein relates generally to processing transactions and, more specifically, to systems and methods for locally processing one or more financial transactions.

BACKGROUND

Merchant devices, such as point-of-sale terminals, allow cardholders to enter into financial transactions. For example, a merchant device may obtain account information, and use the obtained account information to generate a request for authorization for transmission to a payment processing network. At least some known merchant devices are configured to authorize a financial transaction only upon receiving approval of the request for authorization. As such, at least some known merchant devices may decline the financial transaction if a response to the request for authorization is not received in a timely manner.

SUMMARY

Embodiments of the disclosure enable a merchant system to process one or more financial transactions. The merchant system includes a network interface device coupleable to a payment processing network, and a control system configured to receive a payment request associated with a financial transaction, determine a network communication status associated with the network interface device, and locally process the financial transaction by obtaining an account threshold associated with a cardholder account, generating transaction data associated with the financial transaction based on the account threshold, generating indication data associated with the financial transaction, and storing the transaction data for later transmission of the transaction data to the payment processing network.

In another aspect, one or more computer storage media embodied with instructions executable by one or more processors are provided for processing one or more financial transactions. The one or more computer storage media include an interface component that determines a network communication status associated with a network interface device, a presentation component that receives a payment request associated with a financial transaction and generates indication data associated with the financial transaction, a transaction component that obtains an account threshold associated with a cardholder account and generates transaction data associated with the financial transaction based on the account threshold, and a storage component that stores the transaction data for later transmission of the transaction data to the payment processing network.

In yet another aspect, a computer-implemented method is provided for processing one or more financial transactions at a merchant system. The computer-implemented method includes receiving a payment request associated with a financial transaction, determining a network communication status and/or a power connection status, and obtaining an account threshold associated with a cardholder account, generating transaction data associated with the financial transaction based on the account threshold, presenting an indication associated with the financial transaction, and storing the transaction data for later transmission of the transaction data to the payment processing network This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
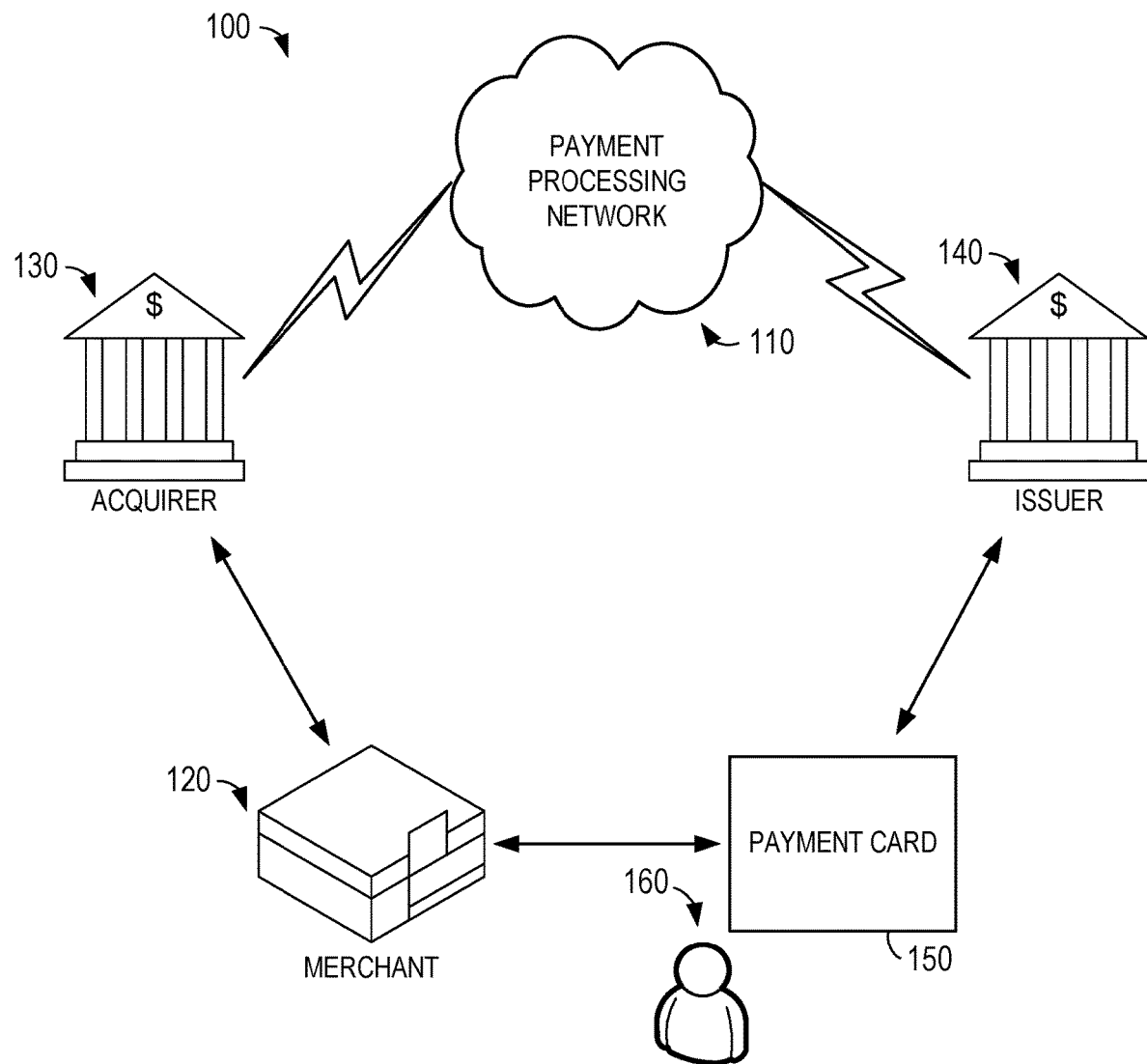
FIG. 1 is a block diagram illustrating an example environment for processing financial transactions.

The subject matter described herein relates to a merchant system that may be used to process one or more financial transactions. Embodiments of the disclosure enable financial transactions to be processed locally at the merchant system. For example, the merchant system may obtain an account threshold associated with a cardholder account used to enter into the financial transaction, and use the account threshold to generate transaction data associated with the financial transaction.

Aspects of the disclosure provide for a computing system that processes one or more transactions in an environment including a plurality of devices coupled to each other via a network (e.g., local area network, wide area network, the Internet). In some embodiments, the merchant system communicates with other computing systems (e.g., payment devices, system servers) to process one or more transactions for one or more users (e.g., cardholders, merchants). For example, the merchant system may communicate with a payment device to obtain an account threshold, use the account threshold to generate transaction data associated with the financial transaction, use the transaction data to present an indication associated with the financial transaction, and store the transaction data at the merchant system to later update the payment processing network.

The systems and processes described herein may be implemented using computer programming or engineering techniques including computer software, firmware, hardware or a combination or subset thereof. At least one technical problem with known merchant systems is that they are not configured to independently process financial transactions. Known merchant systems that are configured to predict how a payment processing network will process a financial transaction require merchant data, cardholder data, etc. to be downloaded from the payment processing network prior to the financial transaction. The embodiments described herein address at least these technical problems.

Processing financial transactions in the manner described in this disclosure may improve user experience and/or user interaction performance. For example, one or more financial transactions may be approved at a merchant system for various combinations of merchants and cardholders (including a merchant and/or cardholder without corresponding data stored at the merchant system prior to the financial transaction) without communicating with a payment processing network. In this manner, the merchant system may be configured to independently process financial transactions and subsequently update the payment processing network. In some embodiments, the subject matter described herein may facilitate improving user efficiency, improving communication between systems, and/or reducing error rate by automating the analysis and processing of one or more transactions.

The technical effect of the systems and processes described herein is achieved by performing at least one of the following operations: a) receiving a payment request associated with a financial transaction, b) determining a network communication status associated with a network interface device, c) determining a power connection status associated with a power interface device, d) selectively configuring a local power source, e) generating an account threshold request, f) transmitting the account threshold request, g) obtaining an account threshold associated with a cardholder account, h) identifying a transaction amount associated with the payment request, i) determining whether the transaction amount satisfies the account threshold, j) generating transaction data associated with the financial transaction, k) generating indication data associated with the financial transaction, l) generating an updated account threshold, m) transmitting the updated account threshold, n) storing the transaction data, o) detecting one or more changes in the network communication status, and/or p) transmitting the transaction data.

FIG. 1 is a block diagram illustrating an example environment 100 for processing one or more financial transactions. The environment 100 includes a payment processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 100 includes one or more merchants 120 that accept payment via the payment processing network 110. To accept payment via the payment processing network 110, the merchant 120 establishes a financial account with an acquirer 130 that is a member of the payment processing network 110. The acquirer 130 is a financial institution that maintains a relationship with one or more merchants 120 to enable the merchants 120 to accept payment via the payment processing network 110. The acquirer 130 may also be known as an acquiring bank, a processing bank, or a merchant bank.

The environment 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the payment processing network 110.

A cardholder 160 uses a payment product, such as a payment card 150, to purchase a good or service from a merchant 120. In some embodiments, the payment card 150 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 150 to purchase a good or service from a merchant 120. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 160 may use any payment product that is linked or associated with a corresponding financial account maintained by an issuer 140. As described herein, the term "payment card" includes credit cards, debit cards, prepaid cards, digital cards, smart cards, and any other payment product that is linked or associated with a corresponding financial account maintained by an issuer 140. Payment cards 150 may have any shape, size, or configuration that enables the environment 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions, including e-commerce transactions, card-not-present transactions, or card-on-file transactions). Account information may include a name of the cardholder 160, an account number, an expiration date, a security code (such as a card verification value (CVV), a card verification code (CVC), and the like), and/or a personal identification number (PIN).

The merchant 120 requests authorization from an acquirer 130 for at least the amount of the purchase. The merchant 120 may request authorization using any financial transaction computing device configured to transmit account information of the cardholder 160 to one or more financial transaction processing computing devices of the acquirer 130. For example, the merchant 120 may request authorization through a point-of-sale (POS) terminal, which reads account information of the cardholder 160 from a microchip or magnetic stripe on the payment card 150, and transmits the cardholder's account information to the one or more financial transaction processing computing devices of the acquirer 130. For another example, the POS terminal reads account information of the cardholder 160 from a device configured to communicate with the POS terminal using contactless payment technology, and transmits the cardholder's account information to one or more financial transaction processing computing devices of the acquirer 130.

Using the payment processing network 110, the financial transaction processing computing devices of the acquirer 130 communicate with one or more financial transaction processing computing devices of an issuer 140 to determine whether the account information of the cardholder 160 matches or corresponds to the account information of the issuer 140, whether the account is in good standing, and/or whether the purchase is covered by (e.g., less than) a credit line or account balance associated with the financial account. Based on these determinations, the financial transaction processing computing devices of the issuer 140 determine whether to approve or decline the request for authorization from the merchant 120.

If the request for authorization is declined, the merchant 120 is notified as such, and may request authorization from the acquirer 130 for a lesser amount or request an alternative form of payment from the cardholder 160. If the request for authorization is approved, an authorization code is issued to the merchant 120, and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer 130 for reimbursing the merchant 120. When a credit card is used, the issuer 140 may bill the cardholder 160 to settle a financial account associated with the cardholder 160. When a debit or prepaid card is used, the issuer 140 may automatically withdraw funds from the account.

Figure 2:
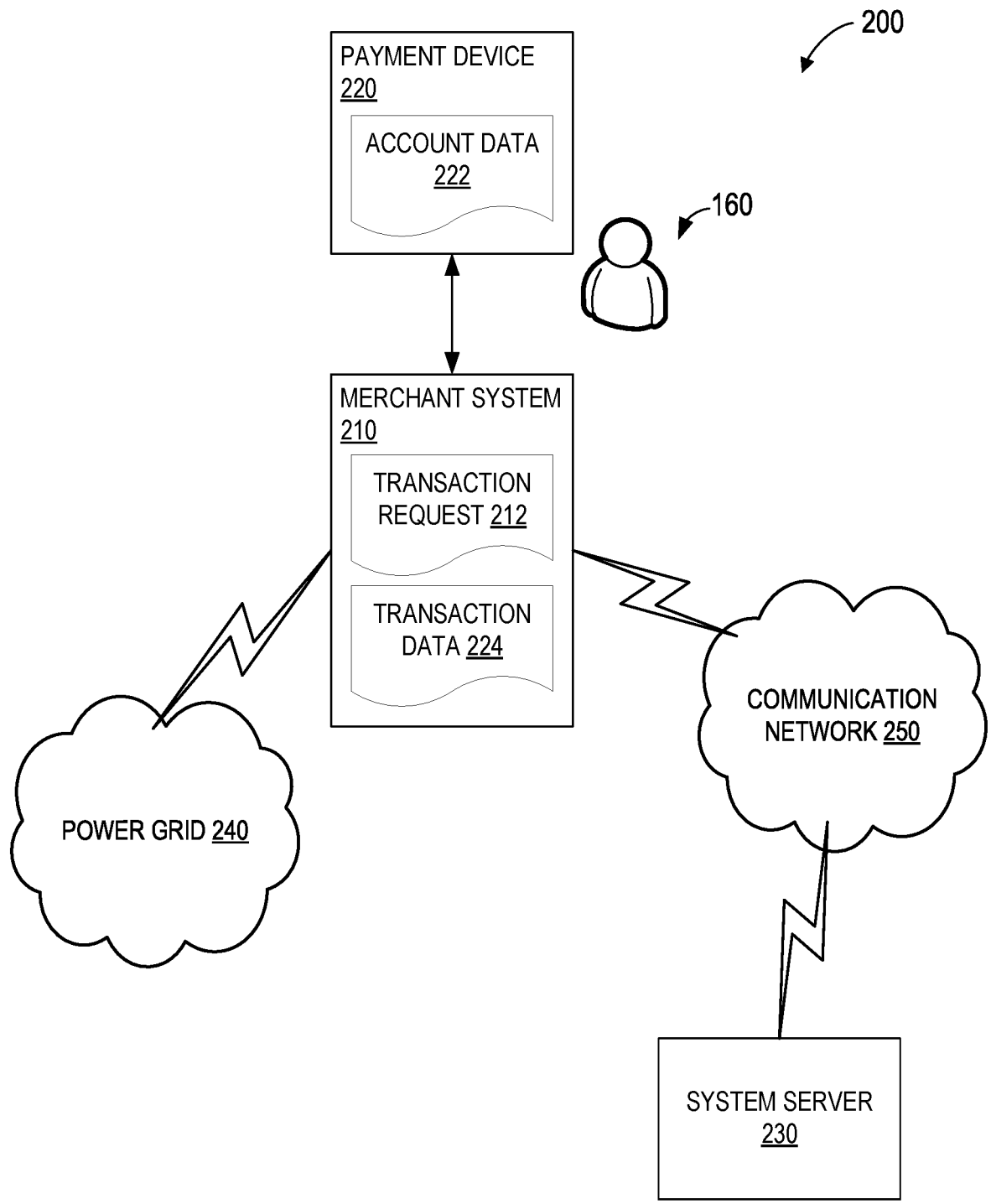
FIG. 2 is a block diagram illustrating an example environment for locally processing financial transactions at a merchant system.

FIG. 2 is a block diagram illustrating an example environment 200 for processing one or more financial transactions at a merchant system 210. In some embodiments, the merchant system 210 allows a cardholder 160 to enter into a financial transaction. The merchant system 210 is configured to process the financial transaction independent of a payment processing network 110. For example, a merchant 120 may utilize the merchant system 210 to locally determine whether to approve or decline a payment request 212 received at the merchant system 210.

In some embodiments, the merchant system 210 communicates with a payment device 220 (e.g., payment card 150) to obtain account data 222 (e.g., account number, expiration date, PIN, credit line, available credit line, account balance) associated with a cardholder account. The merchant system 210 is configured to use the account data 222 to locally generate transaction data 224 associated with the payment request 212. In this manner, the merchant system 210 may process the financial transaction without directly communicating with the payment processing network 110. In some embodiments, the merchant system 210 stores the locally-generated transaction data 224 at the merchant system 210, and later transmits the transaction data 224 to a system server 230 (e.g., a financial transaction processing computing device of the issuer 140) to update the system server 230 based on the transaction data 224. Transaction data 224 may include, for example, a transaction date, a transaction amount, and/or merchant data associated with the payment request 212.

The environment 100 includes one or more power grids 240 configured to provide power (e.g., electricity) to one or more computing systems (e.g., merchant system 210, payment device 220, system server 230) coupled to the power grid 240, and one or more communication networks 250 that enable data to be transferred between a plurality of computing systems (e.g., merchant system 210, payment device 220, system server 230) coupled to the communication network 250. As used herein, a computing system may be understood to mean a single computing device or a plurality of interconnected computing devices that operate together to perform a particular function. That is, each computing system may be contained within a single hardware unit or be distributed among several or many different hardware units, including in a cloud-computing environment. Example communication networks 250 include a cellular or mobile network and the Internet. Alternatively, the communication network 250 may be any communication medium that enables the environment 100 to function as described herein including, for example, a personal area network (PAN), a local area network (LAN), and/or a wide area network (WAN).

Figure 3:
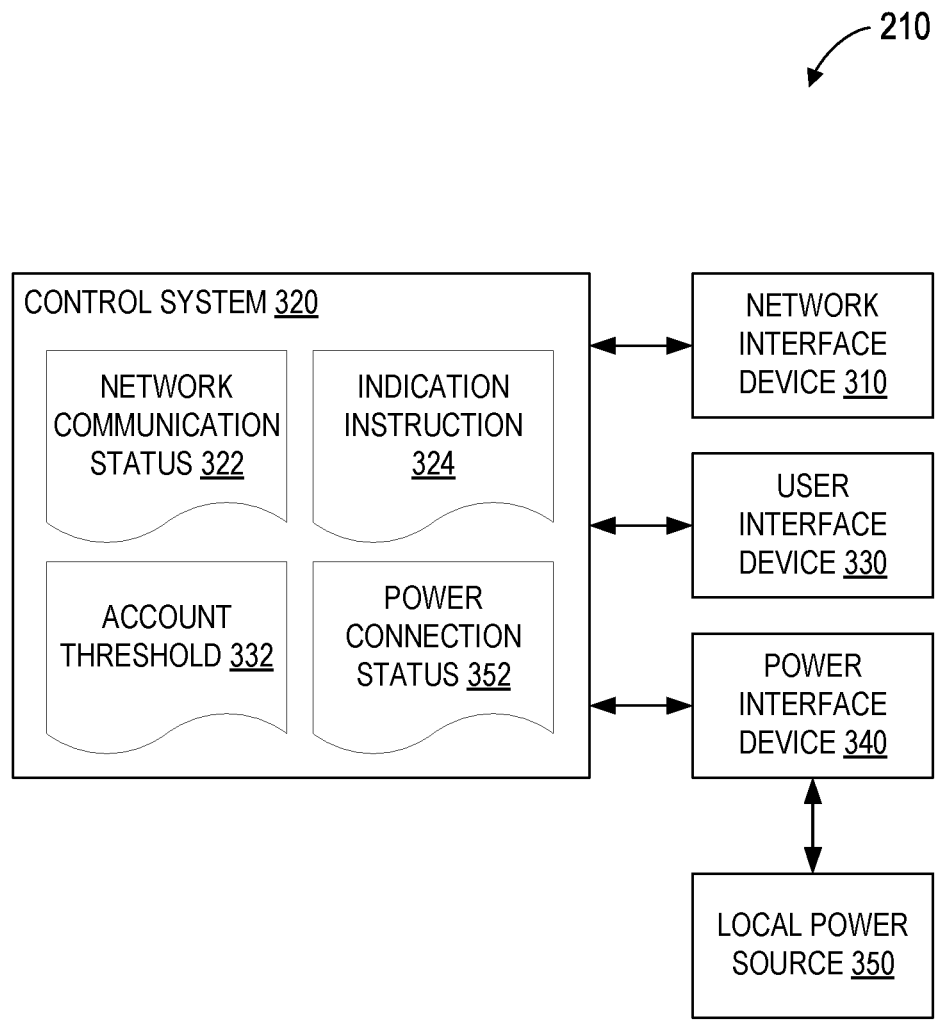
FIG. 3 is a block diagram illustrating an example merchant system that may be used to locally process financial transactions.

FIG. 3 is a block diagram illustrating the merchant system 210 that may be used to process one or more financial transactions. In some embodiments, the merchant system 210 includes a network interface device 310 coupleable to one or more remote financial transaction processing computing devices (e.g., system server 230), and a control system 320 configured to control an operation of the merchant system 210 based on a network communication status 322 associated with the network interface device 310.

For example, a financial transaction may be remotely processed at the system server 230 when the network interface device 310 is in a connected state. In some embodiments, the control system 320 identifies that the network interface device 310 is in the connected state when the network communication status 322 satisfies a network communication threshold (e.g., a data transmission rate between the merchant system 210 and the system server 230 is equal to or greater than a data transmission threshold). When the network interface device 310 is in the connected state, the control system 320 may generate a request for authorization based on the payment request 212, and transmit the request for authorization for processing the financial transaction at the system server 230. Upon receiving a disposition (e.g., a response to the request for authorization) from the system server 230, the control system 320 may generate an indication instruction 324 for presenting an indication associated with the disposition at a user interface device 330.

On the other hand, a financial transaction may be locally processed at the merchant system 210 when the network interface device 310 is in a state other than the connected state (e.g., a disconnected state). In some embodiments, the control system 320 identifies that the network interface device 310 is in the disconnected state when the network communication status 322 does not satisfy the network communication threshold (e.g., the data transmission rate between the merchant system 210 and the system server 230 is less than the data transmission threshold). In this manner, the merchant system 210 may continue financial transaction processing operations in the event of a network communication outage. When the network interface device 310 is in the disconnected state, the control system 320 may communicate with the payment device 220 (e.g., via the user interface device 330) to obtain account data 222 for processing the financial transaction at the merchant system 210. For example, the control system 320 may analyze the account data 222 obtained from the payment device 220 to identify an account threshold 332 (e.g. a first account threshold), and determine whether a transaction amount associated with the payment request 212 satisfies the account threshold 332 (e.g., whether the cardholder account has an available credit line or account balance sized to accommodate the transaction amount).

If the transaction amount does not satisfy the account threshold 332 (e.g., the transaction amount is greater than the available credit line or account balance), the control system 320 declines the payment request 212 and generates an indication instruction 324 for presenting an indication (e.g., that the payment request 212 is declined) associated with the disposition at the user interface device 330. On the other hand, if the transaction amount satisfies the account threshold 332 (e.g., the transaction amount is less than or equal to the available credit line or account balance), the control system 320 approves the payment request 212, generates an indication instruction 324 for presenting an indication (e.g., that the payment request 212 is approved) associated with the disposition at the user interface device 330, and generates an updated account threshold 332 (e.g., a second account threshold) based on the account threshold 332 and the transaction amount. The updated account threshold 332 may be determined, for example, by decreasing the account threshold 332 by the transaction amount.

In some embodiments, the control system 320 communicates with the payment device 220 to update at least some account data 222 (e.g., available credit line, account balance) stored at the payment device 220. For example, the control system 320 may transmit the updated account threshold 332 to the payment device 220 for updating the account threshold 332 at the payment device 220. The payment device 220 may write the received data, for example, to the magnetic stripe or to a memory storage device. In some embodiments, the payment device 220 systematically (e.g., upon receiving user input) or periodically (e.g., daily) communicates with the system server 230 to update at least some account data 222 stored at the payment device 220.

In some embodiments, the merchant system 210 includes a power interface device 340, and a local power source 350 selectively configured between an active mode and an inactive mode. For example, the local power source 350 may be configured to operate in the active mode to provide power (e.g., electricity) to one or more electronic components (e.g., network interface device 310, control system 320, user interface device 330, power interface device 340) coupled to the local power source 350 when power received from the power grid 240 is disrupted or unavailable. In this manner, the merchant system 210 may continue financial transaction processing operations in the event of a power outage.

In some embodiments, the merchant system 210 determines whether a power connection status 352 associated with the power interface device 340 satisfies a power connection threshold (e.g., whether a power transmission rate is equal to or greater than a power transmission threshold), and selectively configures the local power source 350 based on the determination. For example, the local power source 350 may be configured to operate in the active mode when the power connection status 352 does not satisfy the power connection threshold (e.g., the power transmission rate between the merchant system 210 and the power grid 240 is less than the power transmission threshold). On the other hand, the local power source 350 may be configured to operate in the inactive mode when the power connection status 352 satisfies the power connection threshold (e.g., a power transmission rate between the merchant system 210 and the power grid 240 is equal to or greater than a power transmission threshold).

In some embodiments, the control system 320 controls the operation of the merchant system 210 based on the operating mode of the local power source 350 and/or the power connection status 352. For example, the financial transaction may be remotely processed at the system server 230 when the local power source 350 is in the inactive mode and/or when the power connection status 352 satisfies the power connection threshold. On the other hand, the financial transaction may be locally processed at the merchant system 210 when the local power source 350 is in the active mode and/or when the power connection status 352 does not satisfy the power connection threshold.

Figure 4:
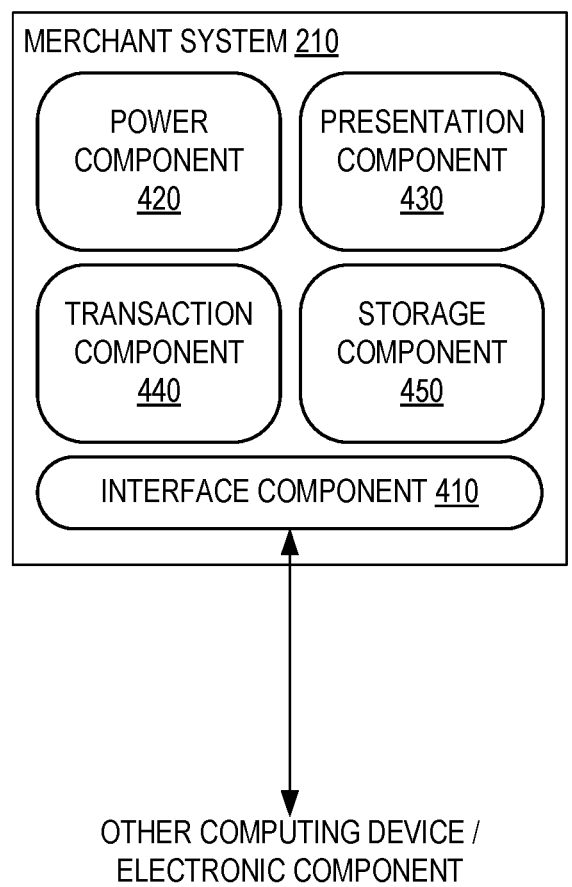
FIG. 4 is a block diagram illustrating a plurality of example components of a merchant system, such as the merchant system shown in FIG. 3.

FIG. 4 is a block diagram illustrating the merchant system 210 including an interface component 410, a power component 420, a presentation component 430, a transaction component 440, and/or a storage component 450. The interface component 410 enables the merchant system 210 to receive data from and/or transmit data to one or more other computing devices (e.g., payment device 220, system server 230). For example, the interface component 410 may be coupled to the power component 420, presentation component 430, transaction component 440, and/or storage component 450 to facilitate communication between another computing device and the power component 420, presentation component 430, transaction component 440, and/or storage component 450. In some embodiments, the interface component 410 facilitates communication between the power component 420, presentation component 430, transaction component 440, and/or storage component 450. Additionally or alternatively, the interface component 410 may enable the merchant system 210 to receive data from and/or transmit data to one or more other computing devices and/or electronic components within the merchant system 210 (e.g., network interface device 310, control system 320, user interface device 330, power interface device 340, local power source 350).

The interface component 410 is configured to determine a network communication status 322 associated with a network interface device 310 that is coupleable to a payment processing network 110 to enable an operation of the merchant system 210 to be selectively controlled based on the network communication status 322. In some embodiments, the interface component 410 monitors the network interface device 310 to detect a change in the network communication status 322, and/or determines whether communication with a payment processing network 110 (e.g., system server 230) is available. For example, the interface component 410 may analyze a detected change to determine whether the network interface device 310 changed from a disconnected state to a connected state.

The power component 420 enables the merchant system 210 to manage power use and/or consumption at the merchant system 210. In some embodiments, the power component 420 determines a power connection status 352 associated with a power interface device 340 that is coupleable to a power grid 240 to enable an operation of the merchant system 210 and/or a local power source 350 to be selectively controlled based on the power connection status 352. For example, the power component 420 may monitor the power interface device 340 to detect a change in the power connection status 352, and/or determine whether power from the power grid 240 is available. In some embodiments, the power component 420 selectively configures the local power source 350 in an inactive mode when power from the power grid 240 is available, and in an inactive mode when power from the power grid 240 is unavailable.

The presentation component 430 enables the merchant system 210 to present information to and/or receive input from a user (e.g., a merchant, a cardholder). For example, the presentation component 430 may receive a payment request 212 associated with a cardholder account. The presentation component 430 is configured to generate indication data (e.g., indication instruction 324), and transmit the indication data to a user interface device 330 (e.g., via the interface component 410) such that the user interface device 330 is configured to present an indication corresponding to the indication instruction 324. In some embodiments, the presentation component 430 generates an indication instruction 324 associated with the payment request 212. Additionally or alternatively, the presentation component 430 may generate an indication instruction 324 associated with a network communication status 322 and/or power connection status 352.

The transaction component 440 enables the merchant system 210 to locally process one or more financial transactions at the merchant system 210. In some embodiments, the transaction component 440 communicates with the interface component 410 and/or power component 420 (e.g., via the interface component 410) to identify a network communication status 322 and/or power connection status 352, and determine whether the financial transaction is to be processed locally (e.g., at the merchant system 210) or remotely (e.g., at the system server 230) based on the identification. For example, the financial transaction may be processed locally at the merchant system 210 when communication with the system server 230 is unavailable, power from the power grid 240 is unavailable, and/or the local power source 350 is in an active mode. On the other hand, the financial transaction may be processed remotely at the system server 230 when communication with the system server 230 is available, power from the power grid 240 is available, and/or the local power source 350 is in an inactive mode.

In some embodiments, the transaction component 440 communicates with a payment device 220 (e.g., via the interface component 410) to obtain an account threshold 332 associated with a cardholder account. For example, the transaction component 440 may generate an account threshold request, and transmit the account threshold request to the payment device 220. In some embodiments, the transaction component 440 analyzes the payment request 212 to identify a transaction amount, and determines whether the transaction amount satisfies the account threshold 332. The transaction component 440 is configured to generate transaction data 224 associated with the payment request 212, and an updated account threshold 332 associated with the cardholder account based on the account threshold 332 and the transaction amount. The transaction data 224 may be transmitted to the storage component 450 for storing the transaction data 224, and the updated account threshold 332 may be transmitted to the payment device 220 for updating account data 222 stored at the payment device 220. In some embodiments, the transaction component 440 communicates with the presentation component 430 (e.g., via the interface component 410) to present a disposition of the financial transaction (e.g., whether the financial transaction is approved or declined).

The storage component 450 enables the merchant system 210 to locally store data at the merchant system 210. In some embodiments, the storage component 450 stores transaction data 224 associated with one or more financial transactions, and transmits the transaction data 224 to the system server 230 to update the system server 230 (e.g., via the interface component 410). The transaction data 224 may be transmitted to the system server 230, for example, upon identifying that communication with the system server 230 is available.

Figure 5:
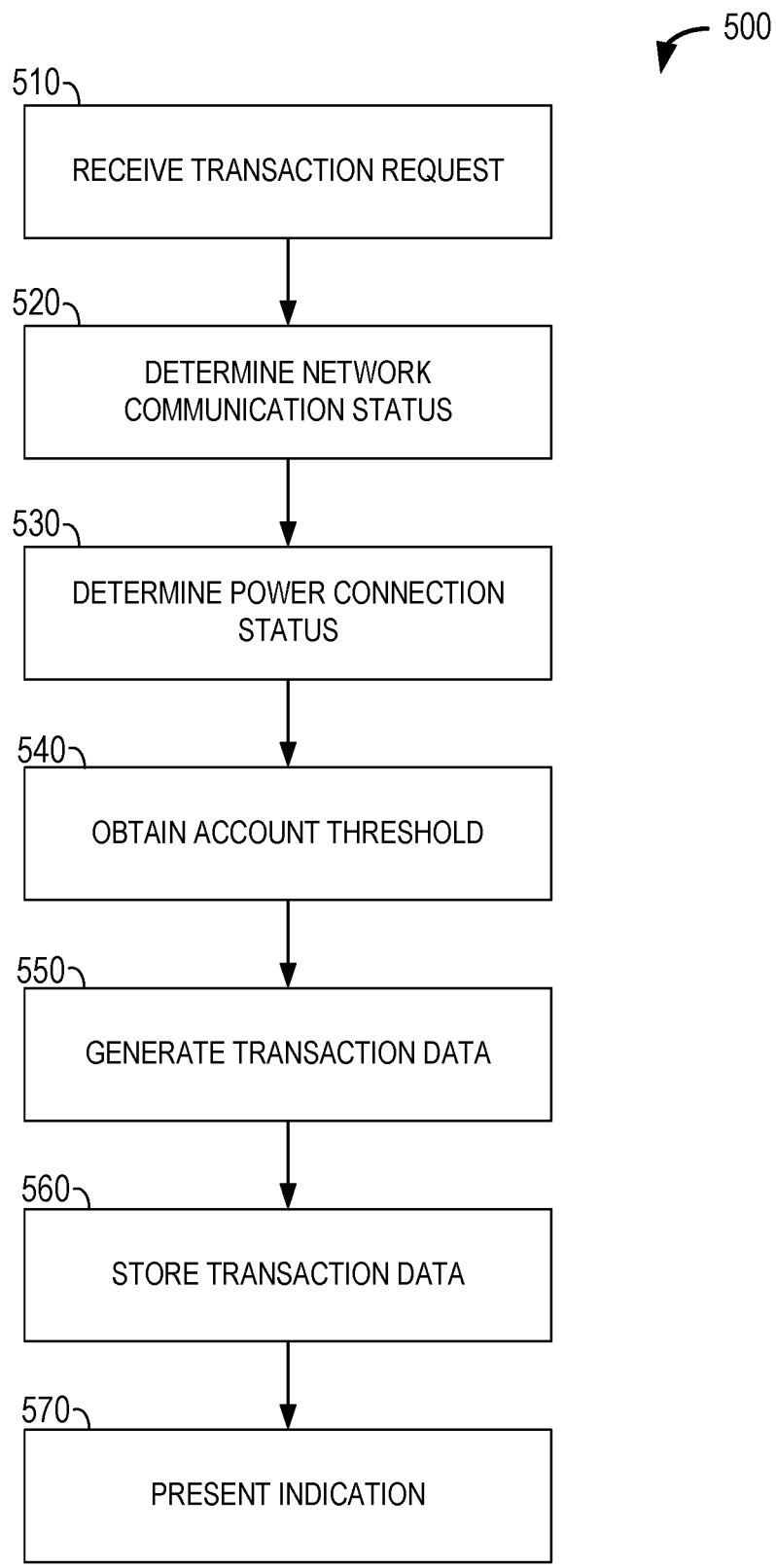
FIG. 5 is a flowchart of an example method for locally processing financial transactions at a merchant system, such as the merchant system shown in FIG. 3.

FIG. 5 is a flowchart of an example method 500 for processing financial transactions at the merchant system 210. In some embodiments, the payment request 212 is received at 510. Upon receiving the payment request 212, it may be determined whether to process the financial transaction locally at the merchant system 210 or remotely at the payment process network (e.g., system server 230). The determination may be made, for example, based on a network communication status 322 associated with the network interface device 310 and/or a power connection status 352 associated with the power interface device 340. In some embodiments, the network communication status 322 is determined at 520, and the power connection status 352 is determined at 530. When the network communication status 322 does not satisfy a network communication threshold and/or the power connection status 352 does not satisfy a power connection threshold, an account threshold 332 may be obtained at 540 and utilized to generate transaction data 224 at 550. The transaction data is stored at 560, and an indication associated with a disposition of the payment request 212 is presented at 570.

Figure 6:
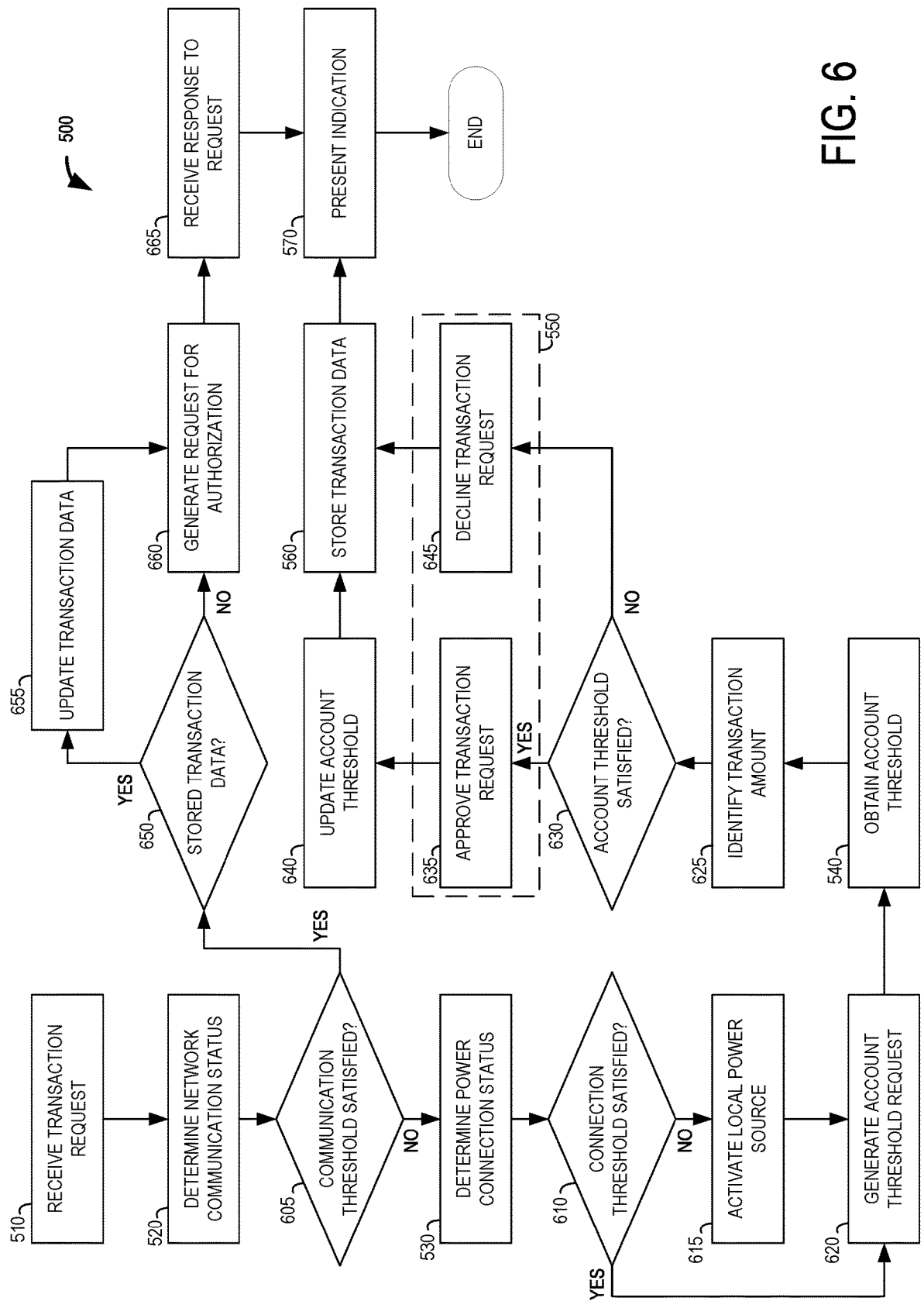
FIG. 6 is a detailed flowchart of the method shown in FIG. 5.

FIG. 6 is a detailed flowchart of the method 500. Upon receiving a payment request 212 at 510, the network communication status 322 may be determined at 520. If it is determined at 605 that the network communication threshold is not satisfied, the power connection status 352 is determined at 530. If it is determined at 610 that the power connection threshold is not satisfied, a local power source 350 may be activated (e.g., in the active mode) to provide power to the merchant system 210, and an account threshold request may be generated at 620. If, on the other hand, it is determined at 610 that the power connection threshold is satisfied, the account threshold request may be generated at 620, the account threshold request may be generated at 620 without activating the local power source 350.

The account threshold request is transmitted to a payment device 220, and an account threshold 332 associated with the account threshold request is obtained at 540. The payment request 212 is analyzed to identify a transaction amount at 625, and it is determined at 630 whether an account threshold is satisfied. If the account threshold is satisfied, the payment request 212 is approved at 630, and the account threshold 332 is updated at 640 or a new account threshold 332 is generated. If, on the other hand, the account threshold is not satisfied, the payment request 212 is declined at 645. Transaction data 550 associated with the financial transaction is stored at 560, and an indication associated with a disposition of the payment request 212 is presented at 570.

If it is determined at 605 that the network communication threshold is satisfied, it may be determined at 650 whether transaction data 224 associated with one or more previously-processed payment requests 212 is stored at the merchant system 210. If there is transaction data 224 stored at the merchant system 210, the transaction data 224 is transmitted to the payment processing network 110 (e.g., system server 230) for updating the payment processing network 110 with the transaction data 224 at 655.

A request for authorization associated with the payment request 212 is generated at 660, and transmitted to the system server 230 at 660. A disposition (e.g., an approval or declination) of the request for authorization is received at 665 from the system server 230, and an indication associated with the disposition is presented at 570.

Figure 7:
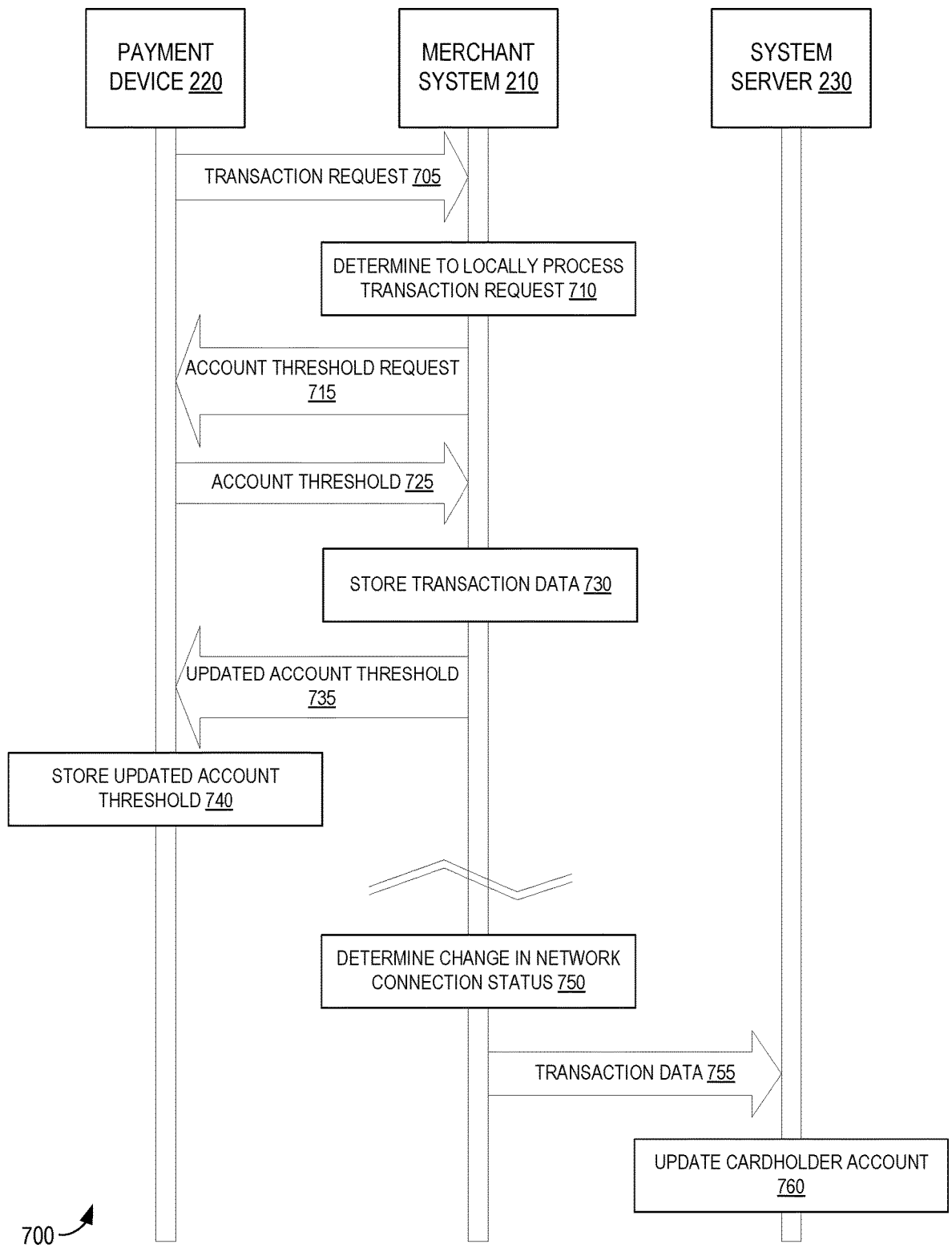
FIG. 7 is a sequence diagram for locally processing financial transactions in an environment, such as the environment shown in FIG. 2.

FIG. 7 is a sequence diagram 700 for locally processing financial transactions at the merchant system 210. For example, a payment device 220 may transmit a payment request 212 to a merchant system 210 at 705. In response to receiving the payment request 212 from the payment device 220, the merchant system 210 determines whether to locally process the financial transaction at 710. If the merchant system 210 determines to locally process the financial transaction, the merchant system 210 may generate and transmit an account threshold request 715 to the payment device 220 to obtain an account threshold 332 associated with a cardholder account. In some embodiments, the payment device 220 identifies the account threshold 332 associated with the cardholder account, and transmits the account threshold 332 to the merchant system 210 at 725.

In response to receiving the account threshold 332 from the payment device 220, the merchant system 210 utilizes the account threshold 332 to locally process the financial transaction. For example, the merchant system 210 may analyze the payment request 212 to generate transaction data 224 associated with the financial transaction, and store the transaction data 224 at 730 for later transmission to a system server 230. In some embodiments, the merchant system 210 generates and transmits an updated account threshold 332 to the payment device 220 at 735, and the payment device 220 stores the updated account threshold 332 at 740 for use in later financial transactions.

The merchant system 210 monitors a network interface device 310 to determines whether a payment processing network 110 (e.g., system server 230) is available to receive an update on the financial transaction. Upon determining a state and/or change in the network communication status 322 at 750 that allows the merchant system 210 to update the payment processing network 110, the merchant system 210 transmits the transaction data 224 to the system server 230 at 755, and the system server 230 uses the transaction data 224 to update the cardholder account at 760.

Figure 8:
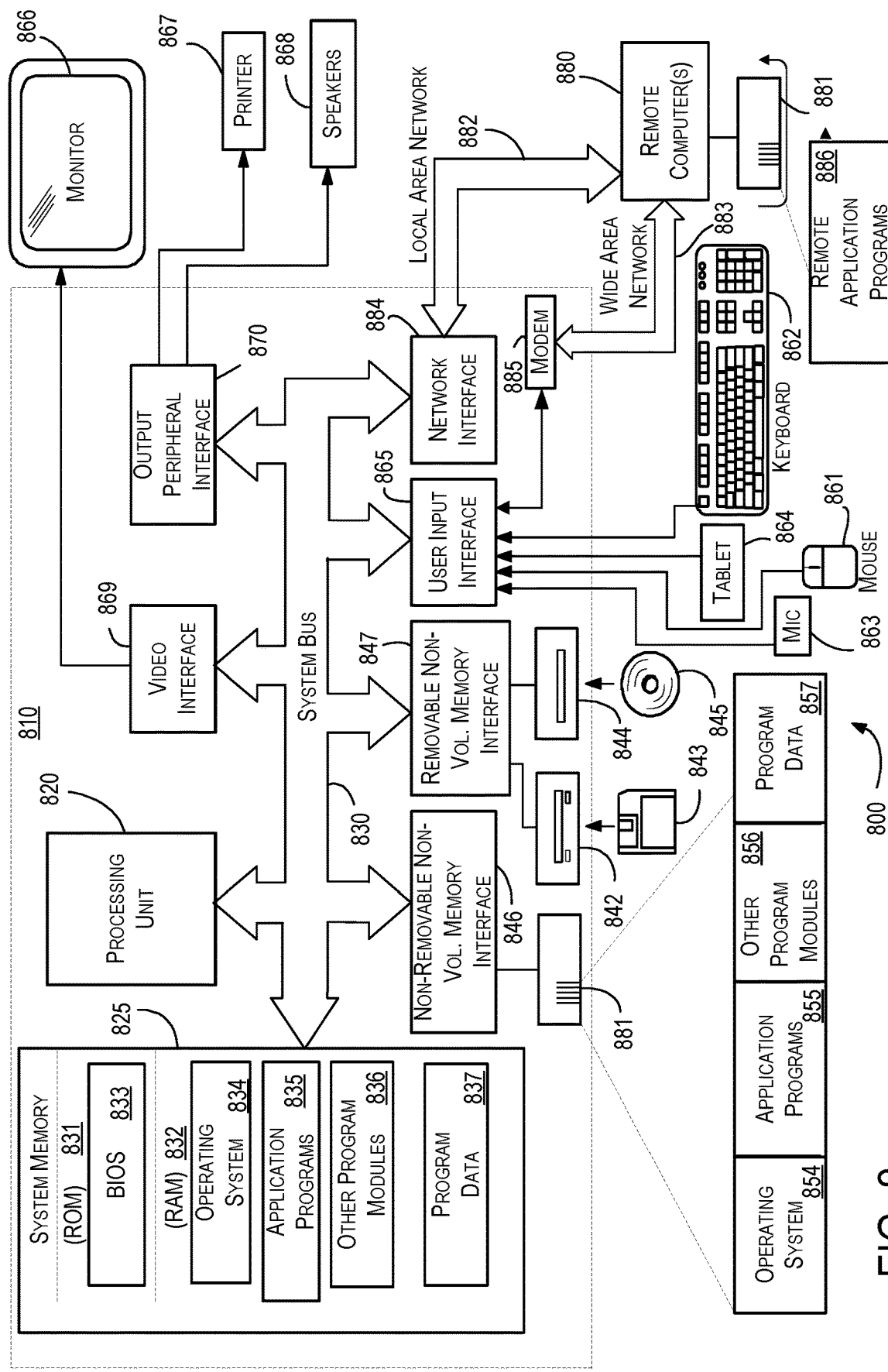
FIG. 8 is a block diagram illustrating an example operating environment for processing financial transactions.

FIG. 8 is a block diagram illustrating an example operating environment 800 that may be used to process one or more financial transactions. The operating environment 800 is only one example of a computing and networking environment and is not intended to suggest any limitation as to the scope of use or functionality of the disclosure. The operating environment 800 should not be interpreted as having any dependency or requirement relating to any one or combination of components illustrated in the example operating environment 800.

The disclosure is operational with numerous other computing and networking environments or configurations. While some examples of the disclosure are illustrated and described herein with reference to the operating environment 800 being associated with or including the merchant system 210, aspects of the disclosure are operable with any computing device (e.g., payment device 220, system server 230, network interface device 310, control system 320, user interface device 330, power interface device 340, interface component 410, power component 420, presentation component 430, transaction component 440, storage component 450) that executes instructions to implement the operations and functionality associated with the operating environment 800.

For example, the operating environment 800 may include a mobile device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 800 may represent a group of processing units or other computing devices. Additionally, any computing device described herein may be configured to perform any operation described herein including one or more operations described herein as being performed by another computing device.

With reference to FIG. 8, an example system for implementing various aspects of the disclosure may include a general purpose computing device in the form of a computer 810. Components of the computer 810 may include, but are not limited to, a processing unit 820 (e.g., a processor), a system memory 825 (e.g., a computer-readable storage device), and a system bus 830 that couples various system components including the system memory 825 to the processing unit 820. The system bus 830 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 825 includes any quantity of media associated with or accessible by the processing unit 820. For example, the system memory 825 may include computer storage media in the form of volatile and/or nonvolatile memory such as read only memory (ROM) 831 and random access memory (RAM) 832. The ROM 831 may store a basic input/output system 833 (BIOS) that facilitates transferring information between elements within computer 810, such as during start-up. The RAM 832 may contain data and/or program modules that are immediately accessible to and/or presently being operated on by processing unit 820. For example, the system memory 825 may store computer-executable instructions, account data 222, transaction data 224, an account threshold 332, and other data.

The processing unit 820 may be programmed to execute the computer-executable instructions for implementing aspects of the disclosure, such as those illustrated in the figures (e.g., FIGS. 5-7). For example, the system memory 825 may include an interface component 410 (shown in FIG. 4), a power component 420 (shown in FIG. 4), a presentation component 430 (shown in FIG. 4), a transaction component 440 (shown in FIG. 4), and/or a storage component 450 (shown in FIG. 4) for implementing aspects of the disclosure. The processing unit 820 includes any quantity of processing units, and the instructions may be performed by the processing unit 820 or by multiple processors within the operating environment 800 or performed by a processor external to the operating environment 800. By way of example, and not limitation, FIG. 8 illustrates operating system 834, application programs 835, other program modules 836, and program data 837.

Upon programming or execution of these components, the operating environment 800 and/or processing unit 820 is transformed into a special purpose microprocessor or machine. For example, the interface component 410, when executed by the processing unit 820, causes the operating environment 800 to determine a network communication status 322; a presentation component 430, when executed by the processing unit 820, causes the operating environment 800 to receive a payment request 212 and generate indication data (e.g., indication instruction 324); a transaction component 440, when executed by the processing unit 820, causes the operating environment 800 to receive an account threshold 332 and generate transaction data 224; and/or a storage component 450, when executed by the processing unit 820, causes the operating environment 800 to store transaction data 224. Although the processing unit 820 is shown separate from the system memory 825, embodiments of the disclosure contemplate that the system memory 825 may be onboard the processing unit 820 such as in some embedded systems.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 842 that reads from or writes to a removable, nonvolatile magnetic disk 843 (e.g., floppy disk, tape cassette), and an optical disk drive 844 that reads from or writes to a removable, nonvolatile optical disk 845 (e.g., compact disc (CD), digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 841 may be connected to the system bus 830 through a non-removable memory interface such as interface 846, and magnetic disk drive 842 and optical disk drive 844 may be connected to the system bus 830 by a removable memory interface, such as interface 847.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 854, application programs 855, other program modules 856 and program data 857. Note that these components may either be the same as or different from operating system 834, application programs 835, other program modules 836, and program data 837. Operating system 854, application programs 855, other program modules 856, and program data 857 are given different numbers herein to illustrate that, at a minimum, they are different copies.

The computer 810 includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 831 and RAM 832 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 810. Computer storage media are implemented in hardware and exclude carrier waves and propagated signals. Any such computer storage media may be part of computer 810.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 810 through one or more input devices (e.g., user interface device 330), such as a pointing device 861 (e.g., mouse, trackball, touch pad), a keyboard 862, a microphone 863, and/or an electronic digitizer 864 (e.g., tablet). Other input devices not shown in FIG. 8 may include a joystick, a game pad, a controller, a satellite dish, a camera, a scanner, an accelerometer, or the like. These and other input devices may be coupled to the processing unit 820 through a user input interface 865 that is coupled to the system bus 830, but may be connected by other interface and bus structures, such as a parallel port, game port or a universal serial bus (USB).

Information, such as text, images, audio, video, graphics, alerts, and the like, may be presented to a user via one or more presentation devices (e.g., user interface device 330), such as a monitor 866, a printer 867, and/or a speaker 868. Other presentation devices not shown in FIG. 8 may include a projector, a vibrating component, or the like. These and other presentation devices may be coupled to the processing unit 820 through a video interface 869 (e.g., for a monitor 866 or a projector) and/or an output peripheral interface 870 (e.g., for a printer 867, a speaker 868, and/or a vibration component) that are coupled to the system bus 830, but may be connected by other interface and bus structures, such as a parallel port, game port or a USB. In some embodiments, the presentation device is integrated with an input device configured to receive information from the user (e.g., capacitive touch-screen panel, controller including a vibrating component). Note that the monitor 866 and/or touch screen panel may be physically coupled to a housing in which the computer 810 is incorporated, such as in a tablet-type personal computer.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 882 and one or more wide area networks (WAN) 883, but may also include other networks. Such networking environments are commonplace in offices, enterprise-wide computer networks, intranets and the Internet.

When used in a LAN networking environment, the computer 810 is coupled to the LAN 882 through a network interface or adapter 884 (e.g., network interface device 310). When used in a WAN networking environment, the computer 810 may include a modem 885 or other means for establishing communications over the WAN 883 (e.g., network interface device 310), such as the Internet. The modem 885, which may be internal or external, may be connected to the system bus 830 via the user input interface 865 or other appropriate mechanism. A wireless networking component such as comprising an interface and antenna may be coupled through a device such as an access point or peer computer to a LAN 882 or WAN 883. In a networked environment, program modules depicted relative to the computer 810, or portions thereof, may be stored in the remote memory storage device. By way of example, and not limitation, FIG. 8 illustrates remote application programs 886 as residing on memory storage device 881. It may be appreciated that the network connections shown are examples and other means of establishing a communications link between the computers may be used.

The block diagram of FIG. 8 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 8 may be performed by other elements in FIG. 8, or an entity (e.g., processor, web service, server, applications, computing device, etc.) not shown in FIG. 8.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for processing financial transactions. For example, the elements illustrated in FIG. 1-4, 7, or 8 such as when encoded to perform the operations illustrated in FIGS. 5-7 constitute at least an example means for receiving a payment request (e.g., interface component 410), an example means for determining a network communication status (e.g., interface component 410), an example means for determining a power connection status (e.g., power component 420), an example means for receiving an account threshold (e.g., transaction component 440), an example means for generating transaction data (e.g., transaction component 440), an example means for presenting an indication (e.g., user interface device 330), and/or an example means for storing transaction data (e.g., storage component 450).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A merchant system for use in processing one or more financial transactions, the merchant system comprising:
   a network interface device coupleable to a payment processing network; and
   a control system that, upon execution by one or more processors, receives from a payment device associated with a user, a payment request associated with a financial transaction, determines a network communication status associated with the network interface device for communication with the payment processing network, and, based on conditions that the network communication status does not satisfy a network communication threshold that comprises a predetermined data transmission rate and that a power transmission rate from a power grid coupled to a power interface device is below a power transmission threshold, locally processes the financial transaction at the merchant system, without communicating with the payment processing network, by:
   analyzing the received payment request and determining a transaction amount based on the analysis;

sending a request to the payment device for an account threshold;

based on the sent request, receiving the account threshold from the payment device;

comparing the transaction amount with the received account threshold;

based on the comparison, determining whether the transaction amount satisfies the account threshold;

on condition that the transaction amount satisfies the account threshold, approving the received payment request locally at the merchant system;

updating the account threshold based on the approving of the received request to generate an updated threshold;

providing the updated account threshold to the payment device for storing;

generating, at the merchant system, transaction data associated with the financial transaction, based on the approving of the received request, the transaction data including the updated threshold;

storing, at the merchant system, the transaction data for later transmission of the transaction data to the payment processing network; and presenting an indication to the payment device indicating that the payment request has been approved.

2. The merchant system of claim 1 further comprising:
a local power source selectively configurable between an active mode and an inactive mode, wherein the control system is configured to determine a power connection status associated with the power interface device, and, on condition that the power connection status does not satisfy a power connection threshold, selectively configure the local power source to be in the active mode.

3. The merchant system of claim 1, wherein, on condition that the network communication status satisfies the network communication threshold, the control system is configured to:
transmit the transaction data to the payment processing network; and
update a system server in communication with the payment processing network with the transaction data.

4. The merchant system of claim 3, wherein, the network communication status satisfies the network communication threshold when a predetermined data transmission rate between the merchant system and the system server is equal to or greater than a data transmission threshold.

5. The merchant system of claim 1, wherein, on condition that the network communication status does not satisfy the network communication threshold, the control system is configured to:
based on the account threshold and the transaction amount, generate a second account threshold; and
transmit, to the payment device, the second account threshold.

6. The merchant system of claim 1, wherein the control system is configured to:
monitor the network interface device to detect one or more changes in the network communication status; and
upon detecting a change in the network communication status from a disconnected state to a connected state, transmit, to the payment processing network, the transaction data associated with the financial transaction.

7. One or more computer storage media embodied with instructions executable by one or more processors for processing one or more financial transactions at a merchant system, the one or more computer storage media comprising:
an interface component that, upon execution by at least one processor of the one or more processors, analyzes a network communication status associated with a network interface device for communication with the payment processing network, and, determines, based on the analysis, that the network communication status does not satisfy a network communication threshold that comprises a predetermined data transmission rate;
a power component that, upon execution by the at least one processor, determines that a power transmission rate from a power grid coupled to a power interface device is below a power transmission threshold;
a presentation component that, upon execution by the at least one processor, receives from a payment device associated with a user, a payment request associated with a financial transaction, and analyzes the received payment request to determine a transaction amount based on the analysis;
a transaction component that, upon execution by the at least one processor;
analyzes the received payment request to determine a transaction amount;
sends a request to the payment device for an account threshold;
compares the transaction amount with the received account threshold;
based on the comparison, determines whether the transaction amount satisfies the account threshold;
on condition that the transaction amount satisfies the account threshold, approves the received payment request locally at the merchant system without communicating with the payment processing network;
updates the account threshold based on the approving of the received request to generate an updated threshold, and generates, at the merchant system, transaction data associated with the financial transaction based on the approving of the received request, the transaction data including the updated account threshold;
provides the updated account threshold to the payment device for storing;
presents an indication to the payment device indicating that the payment request has been approved; and
a storage component that, upon execution by the at least one processor, stores the transaction data for later transmission of the transaction data to the payment processing network.

8. The one or more computer storage media of claim 7, wherein on determining that the network communication status satisfies the network communication threshold, the interface component:
transmits the transaction data to the payment processing network; and
updates a system server in communication with the payment processing network with the transaction data.

9. The one or more computer storage media of claim 8, wherein the network communication status satisfies the network communication threshold upon a predetermined data transmission rate between the merchant system and the system server being equal to or greater than a data transmission threshold.

10. The one or more computer storage media of claim 7, wherein the transaction component is configured to generate an account threshold request, and transmit the account threshold request.

11. The one or more computer storage media of claim 7, wherein the transaction component is configured to generate a second account threshold based on the first account threshold and the transaction amount, and transmit the second account threshold to the payment card device.

12. The one or more computer storage media of claim 7, wherein the interface component is configured to monitor the network interface device to detect one or more changes in the network communication status, identify a change from a disconnected state to a connected state, and transmit, to the storage component, data associated with the change from the disconnected state to the connected state, and the storage component is configured to transmit the transaction data associated with the financial transaction upon receiving the data associated with the change from the disconnected state to the connected state.

13. A computer-implemented method for processing one or more financial transactions at a merchant system, the computer-implemented method comprising:
   receiving, from a payment device associated with a user, a payment request associated with a financial transaction;
   determining a network communication status, for communication with a payment processing network, the network communication status associated with a network interface device coupleable to the payment processing network;
   on condition that the network communication status does not satisfy a threshold comprising a predetermined data transmission rate and a power transmission rate from a power grid coupled to a power interface device is below a power transmission threshold, determining a transaction amount associated with the financial transaction based on the received payment request and locally processing the financial transaction at the merchant system, without communicating with the payment processing network, by:
      sending a request to the payment device for an account threshold;
      based on the sent request, receiving the account threshold from the payment device;
      comparing the transaction amount with the received account threshold;
      on condition that the transaction amount satisfies the account threshold, approving the received payment request locally at the merchant system;
      updating the account threshold based on the approving of the received request to generate an updated account threshold;
      providing the updated account threshold to the payment device for storing;
      generating, at the merchant system, transaction data associated with the financial transaction, based on the approving of the received request, the transaction data including the updated account threshold;
      storing the transaction data for later transmission of the transaction data to the payment processing network; and
      presenting an indication to the payment device indicating that the payment request has been approved.

14. The computer-implemented method of claim 13, wherein, on condition that the network communication status satisfies the network communication threshold, the method further comprising:
   transmitting the transaction data to the payment processing network; and
   updating a system server in communication with the payment processing network with the transaction data.

15. The computer-implemented method of claim 13 further comprising:
   generating a second account threshold based on the account threshold and the transaction amount; and
   transmitting, to the payment device, the second account threshold.

16. The computer-implemented method of claim 14, wherein, the network communication status satisfies the network communication threshold upon a predetermined data transmission rate between the merchant system and the system server being equal to or greater than a data transmission threshold.

17. The merchant system of claim 1, wherein the account threshold comprises an available credit line or an account balance associated with the user.

18. The merchant system of claim 2, wherein configuring the local power source to be in active mode comprises determining that power from the power grid is not available, and based on the determination, configuring the local power source to be in active mode.

19. The one or more computer storage media of claim 7, wherein the account threshold comprises an available credit line or an account balance associated with the user.

20. The computer-implemented method of claim 13, wherein the account threshold comprises an available credit line or an account balance associated with the user.

* * * * *